A. B. LANDIS.
GRINDING MACHINE.
APPLICATION FILED DEC. 22, 1905.

945,463.

Patented Jan. 4, 1910.
7 SHEETS—SHEET 1.

A. B. LANDIS.
GRINDING MACHINE.
APPLICATION FILED DEC. 22, 1905.
945,463.
Patented Jan. 4, 1910.
7 SHEETS—SHEET 5.
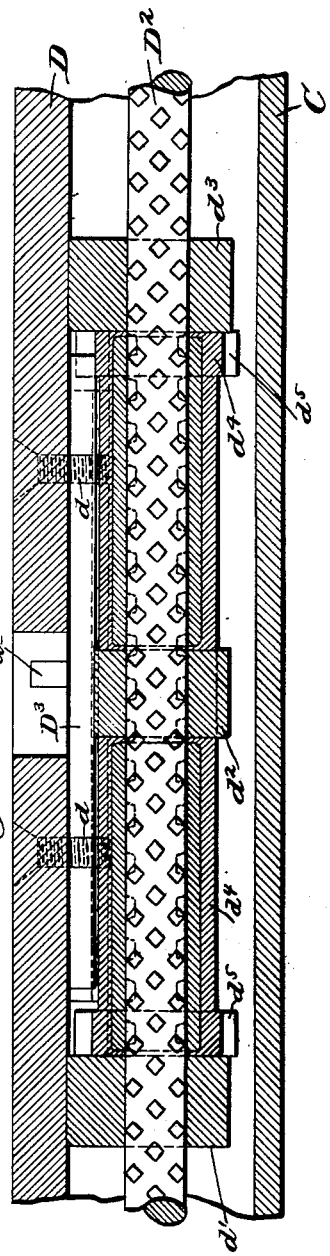
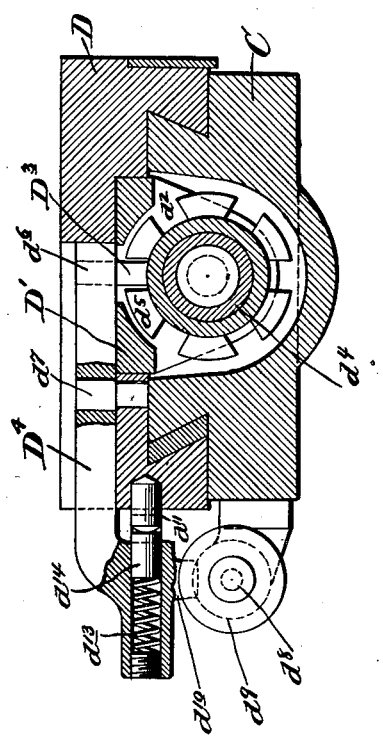

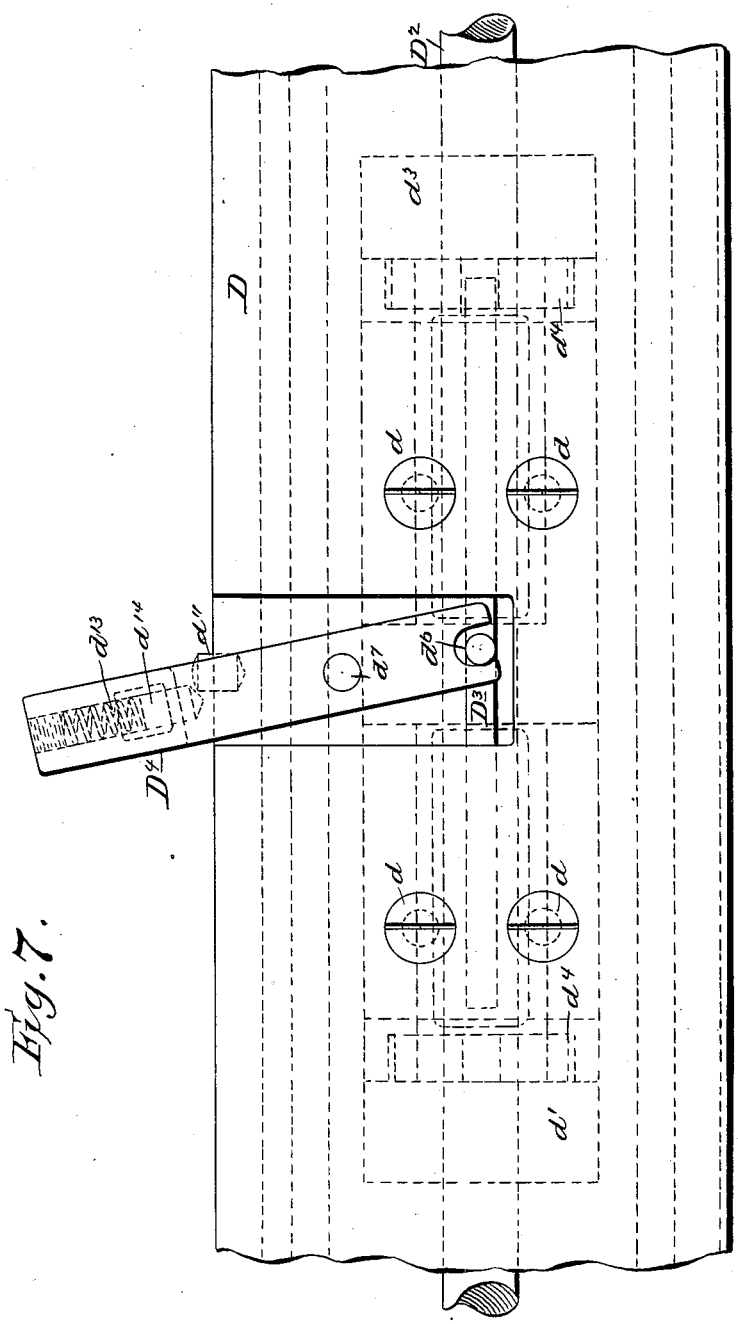

A. B. LANDIS.
GRINDING MACHINE.
APPLICATION FILED DEC. 22, 1905.

945,463.

Patented Jan. 4, 1910.
7 SHEETS—SHEET 7.

Witnesses:
Franck L. Ourand
M. W. Darg

Abraham B. Landis,
Inventor
By E. W. Bradford
Attorney

UNITED STATES PATENT OFFICE.

ABRAHAM B. LANDIS, OF WAYNESBORO, PENNSYLVANIA, ASSIGNOR TO LANDIS TOOL COMPANY, A CORPORATION OF PENNSYLVANIA.

GRINDING-MACHINE.

945,463.      Specification of Letters Patent.      Patented Jan. 4, 1910.

Application filed December 22, 1905. Serial No. 293,003.

*To all whom it may concern:*

Be it known that I, ABRAHAM B. LANDIS, a citizen of the United States, residing at Waynesboro, in the county of Franklin and State of Pennsylvania, have invented certain new and useful Improvements in Grinding-Machines, of which the following is a specification.

My said invention consists in certain improvements in the construction and arrangement of parts of grinding machines of that particular character designed for grinding small work, such as cutters and reamers, and like articles of a small or light character, the object being to provide a machine for such work which will be comparatively small and compact and also complete and automatic in all its operative parts, all as will be hereinafter more fully described and claimed.

Figure 1:
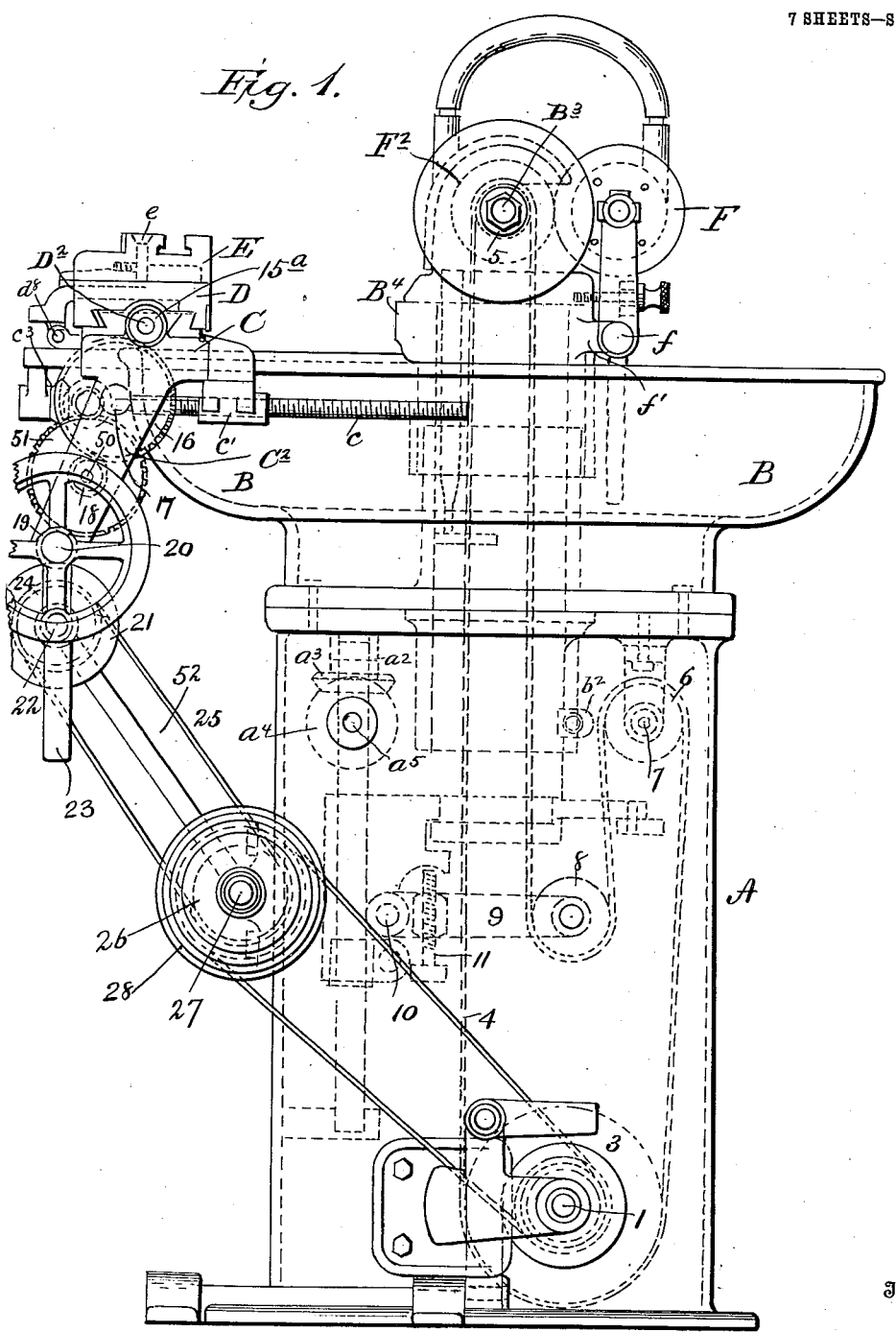
Figure 2:
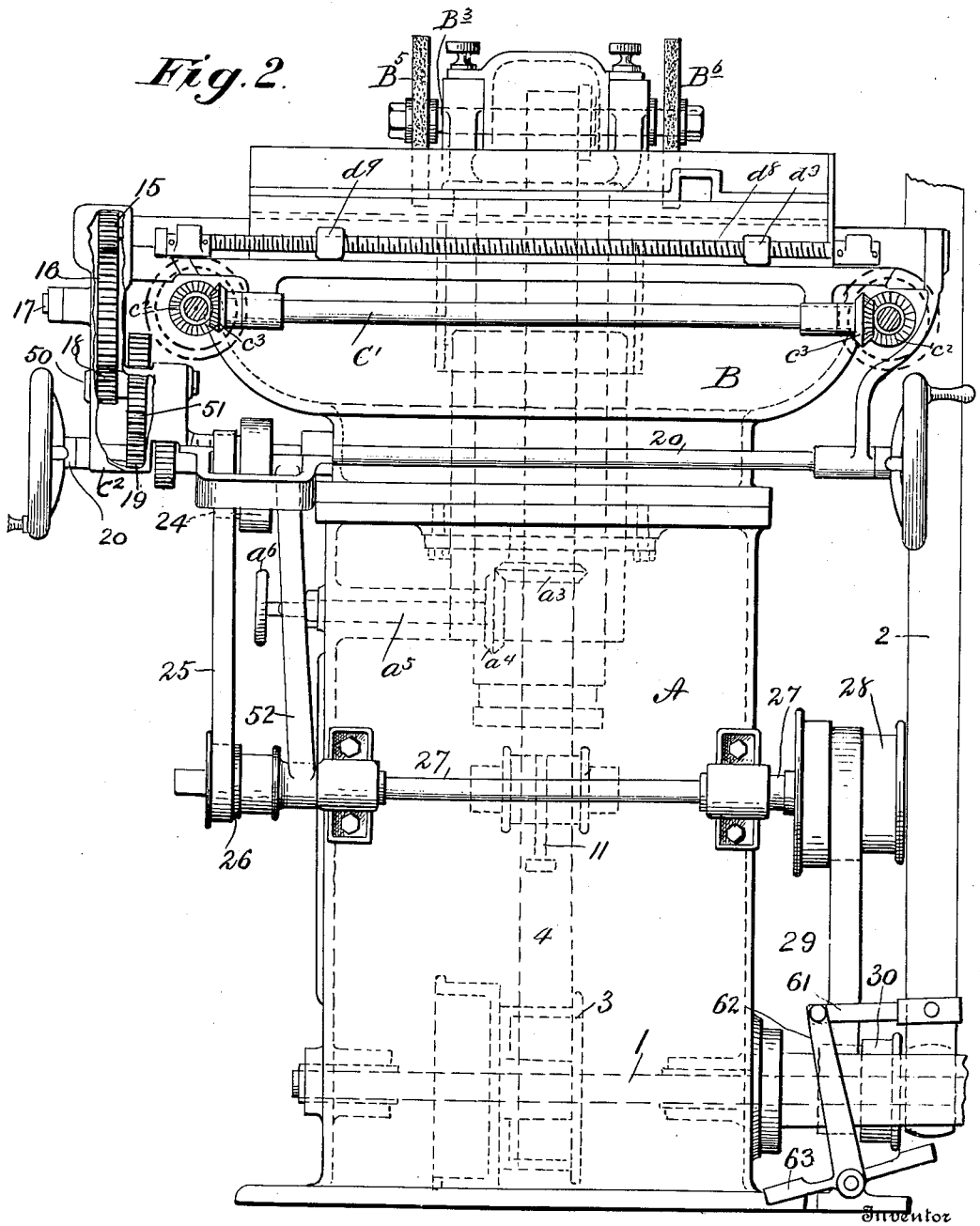
Figure 3:
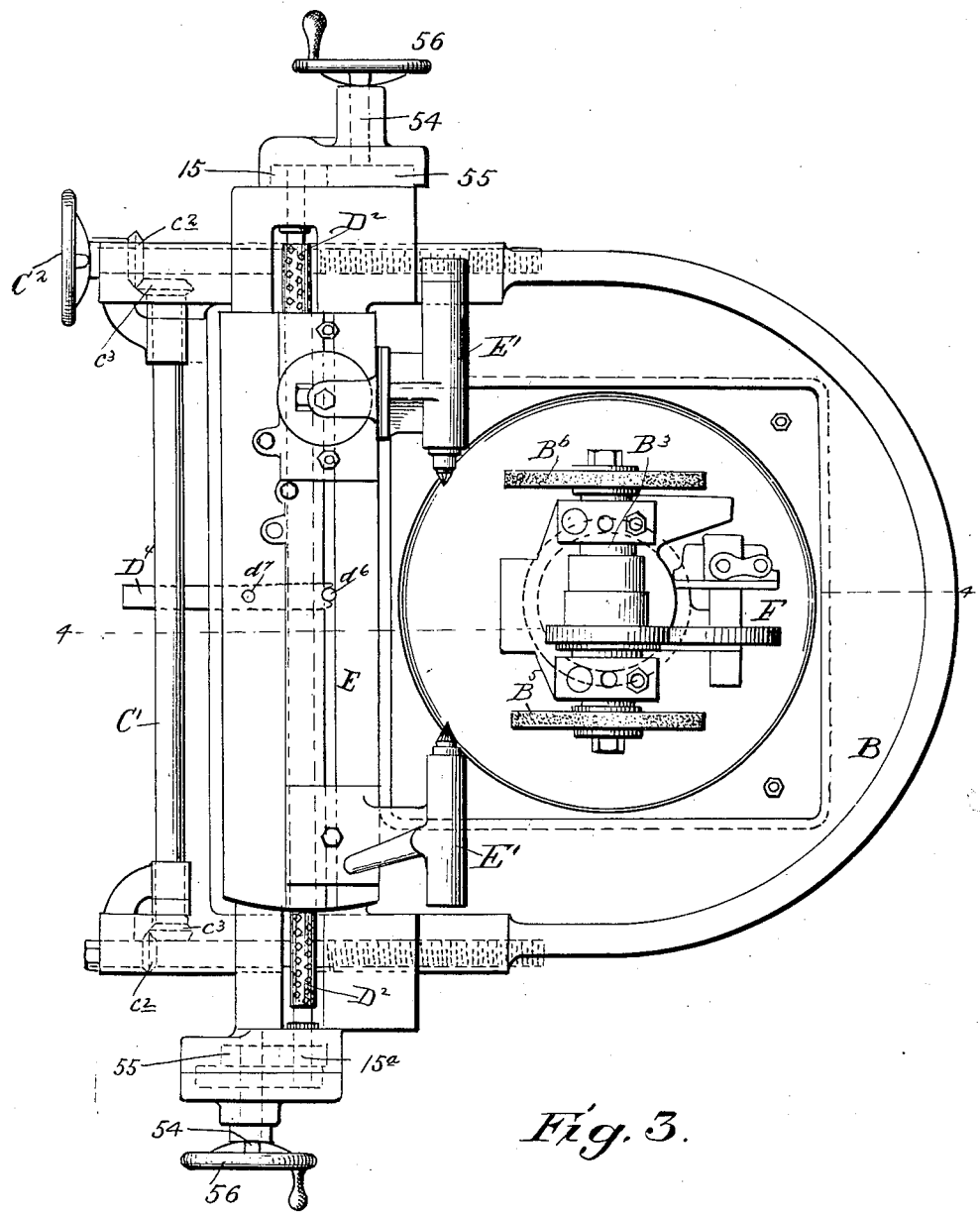
Figure 4:
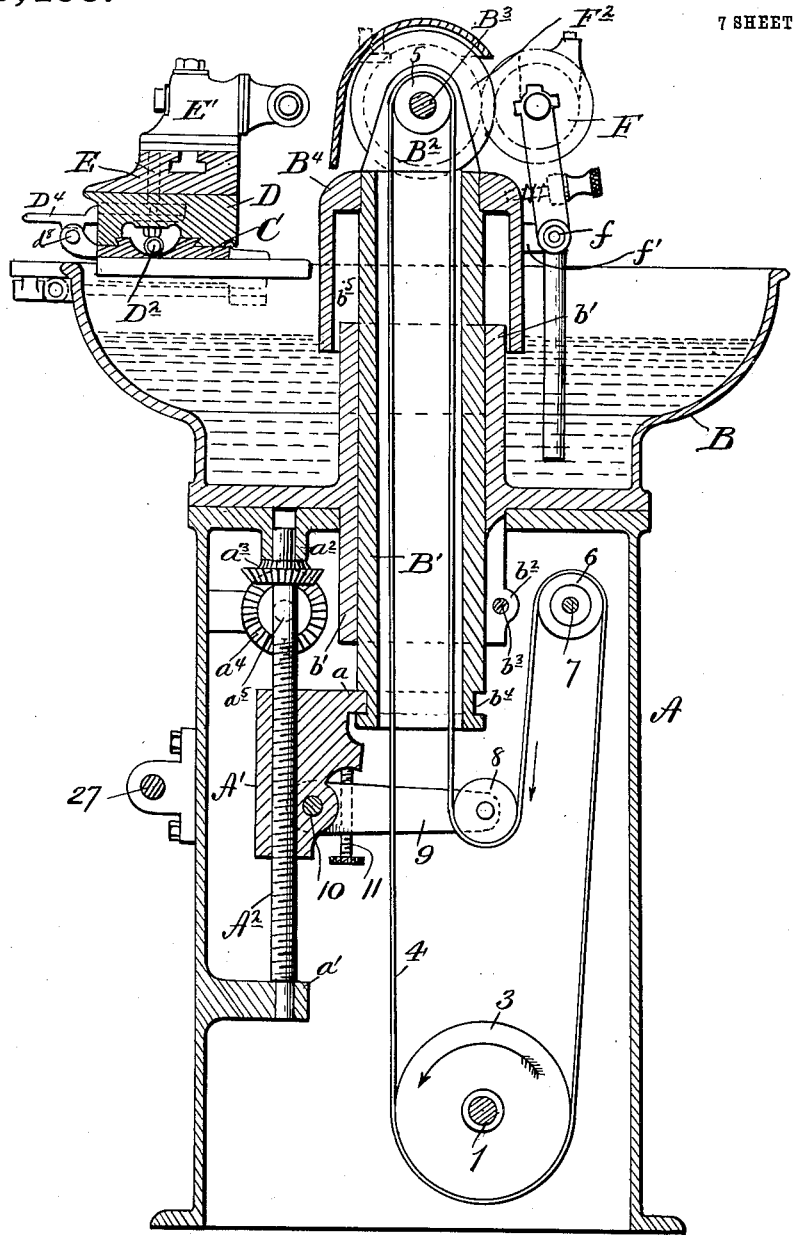
Figure 8:
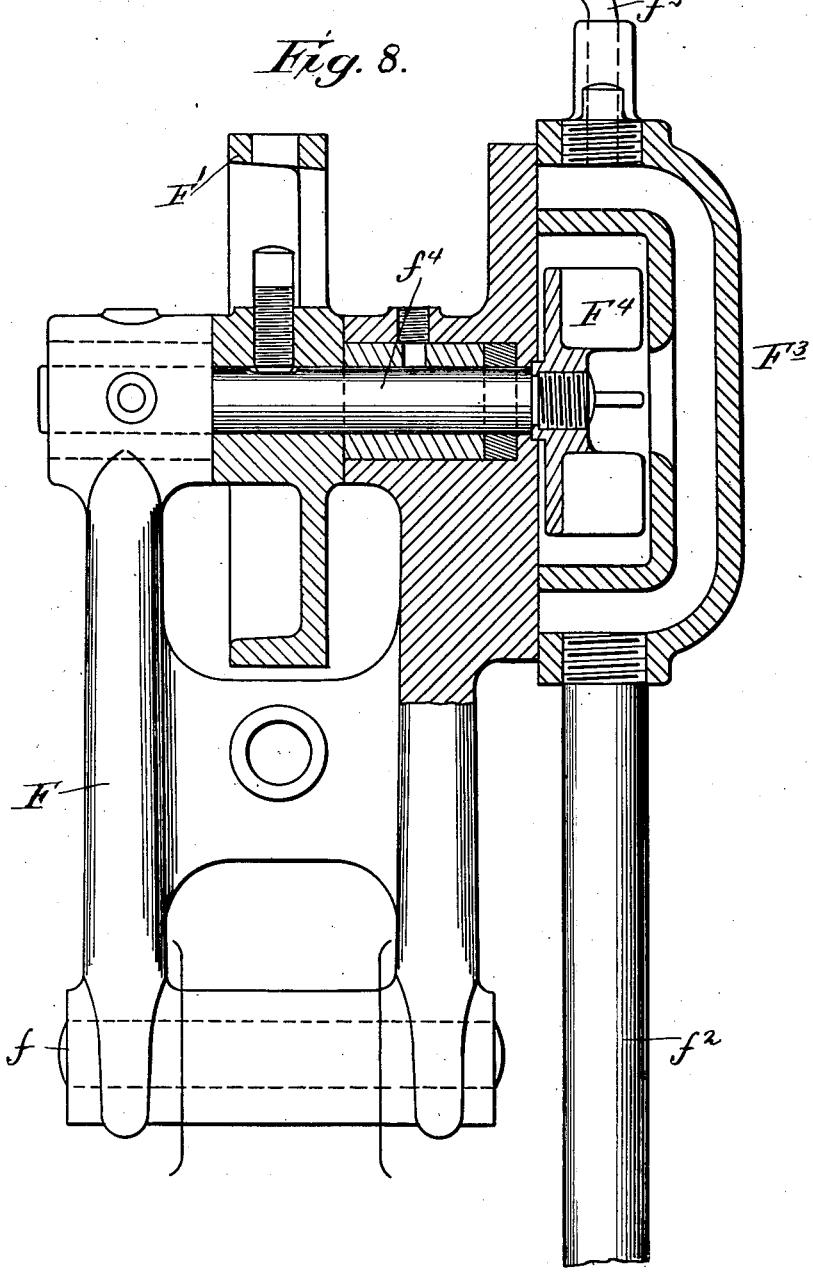

Referring to the accompanying drawings which are made a part hereof and on which similar reference characters indicate similar parts, Figure 1 is a side elevation of a machine of the character indicated, Fig. 2 a front elevation of the same, Fig. 3 a top or plan view of the same, Fig. 4 a central vertical section on the dotted line 4—4 in Fig. 3, Figs. 5, 6 and 7 detail views illustrating the particular mechanism for traversing the work-holding carriage, and Fig. 8 a detail view of a pump used for supplying water to the work.

In said drawings the portions marked A represent the main base of the machine, B the upper portion or top of the frame, C the work-holding carriage, D the slider thereof, E the swiveled base supporting the head and foot stocks of said slider and F a pump.

The base A consists of a suitable hollow casting of a construction adapted to support the other parts of the mechanism and having suitable bearings for the various shafts and the other parts mounted therein.

The part B is a casting in the shape of a bowl adapted to contain a supply of water for use in keeping the work cool during the operation, as will be presently described. Said casting B is mounted upon base A and is formed with a central perforation surrounded by an annular flange $b$ which extends for a considerable distance upwardly within said bowl, and another flange $b'$ which extends downwardly from the bottom of said bowl and fits within a perforation formed therefor in the top of the base A. A grinding wheel support comprising a sleeve $B'$ is mounted in the perforation thus formed in the center of the bowl B, being of a size to just fit within said perforation. The lower flange $b'$ is split on one side and has ears $b^2$ through which a screw $b^3$ extends by means of which said flange may be clamped upon said sleeve to hold it in any annular adjustment desired. The lower end of said sleeve $B'$ is formed with an annular groove $b^4$ with which a yoke $a$, formed on a block $A'$, is adapted to engage, said yoke being formed to extend around approximately one-half of the circumference of said sleeve within said groove $b^4$. Said block $A'$ is formed (preferably cast) with a vertical screw-threaded perforation and is mounted upon a screw-threaded rod $A^2$ which is journaled in suitable bearings in projections $a'$ and $a^2$ formed on the base A. Said screw-rod has a beveled gear $a^3$ at one end which meshes with another beveled gear $a^4$ on a horizontal shaft $a^5$ which extends outside of base A and has a hand-wheel $a^6$ thereon by which it may be turned to operate said screw-rod $a^2$ and thus adjust said sleeve $B'$ vertically as desired. On the top of said sleeve $B'$ are formed the supports $B^2$ carrying the bearings in which the grinding-wheel spindle $B^3$ is journaled. A casting $B^4$ is mounted upon the top of said sleeve $B'$ having a downwardly projecting flange $b^5$, which surrounds the top of the upwardly projecting flange $b'$ and is adapted to telescope over said flange and thus project the joint between the sleeve $B'$ and said flange $b'$ from the water being used upon the work during the operation of grinding.

The main driving shaft 1 is mounted in suitable bearings near the lower part of base A being connected by a belt 2 with any suitable driving power. A pulley 3 is mounted upon said shaft 1 inside of said base A directly beneath the sleeve $B'$ and is connected by a belt 4, which passes through said sleeve with a pulley 5 on the grinding wheel spindle $B^3$. Said belt passes over said pulley 5, down under said pulley 3, up over an idler 6, which is mounted upon a shaft 7 in the upper end of base A, then down under another idler 8, which is mounted upon the outer end of an arm 9, which arm is mounted upon a pivot 10 on one side of the block $A'$ on the screw-rod $A^2$. A screw 11 passes upwardly through said pivoted arm 9 and bears against a projecting part of said block $A'$ and thus serves as a means for drawing said arm 9 down to tighten said belt 4 as may be necessary from time to time because of the wear or stretching thereof. By reason of said belt-tightening device being mounted upon said block $A'$ the adjustment of said casting and the sleeve $B'$ connected therewith carries with it said belt-tightening device and the tension of said belt is thus not changed by such adjustment. The grinding wheels $B^5$ and $B^6$ are preferably mounted one on each end of the grinding wheel spindle $B^3$ and may be adjusted by turning said sleeve $B'$ to bring either one or the other into operative position as may be desired by the particular character of work to be done, as will be readily understood.

The work holding carriage C extends across the top of the bowl B and is mounted to slide on ways formed upon the upper edges of said bowl, which on this side of the machine are parallel, as shown most plainly in Fig. 3. Screw-rods $c$ engage with screw-threaded perforations in depending arms $c'$ on each end of said carriage. Said screw-rods are mounted in suitable bearings on the sides of said bowl B and have beveled gears $c^2$ on their outer ends which are connected with each other by a shaft $C'$ journaled in suitable bearings on the outside of said bowl and having beveled gears $c^3$ on each end which engage with said beveled gears $c^2$. A hand wheel $c^2$ on the outer end of one or both of said screw-rods $c$ serves as a means for turning said screw-rods and thus adjust said carriage to or from the grinding wheel.

The slider D is mounted to slide lengthwise upon the top of said carriage C being connected thereto by the usual dove-tailed sliding connection. A longitudinal casting $D'$ is secured to the under side of said slider D by means of screws $d$ and has downwardly extending flanges $d'$, $d^2$ and $d^3$ in which are formed perforations through which the traversing screw $D^2$ extends. Said traversing screw $D^2$ is journaled at its ends in bearings in the carriage C (see Fig. 3) and is formed with a right and left hand screw-thread, as shown most clearly in Fig. 5, the thread being cut in both directions on said shaft leaving diamond shaped projections as shown. A nut $d^4$ is mounted upon said screw adjacent to each of the depending arms $d'$ and $d^3$ and each nut is formed with radial projections $d^5$ around its periphery, forming radial slots between said projections. Said nuts are adapted to revolve freely with said screw except when locked. A sliding bar $D^3$ is mounted in a longitudinal groove in said casting $D'$ and is adapted to slide back and forth to engage between the flanges of one or the other of said nuts and lock it in a fixed position. Said bar $D^3$ has a pin $d^6$ which projects upwardly through a slot in slider D and is connected to one end of a lever $D^4$ which is mounted upon a pivot $d^7$ on the top of said slider D. Said screw $D^2$ is driven from the main driving shaft by a train of gearing consisting of a pinion 15 on its outer end which meshes with a gearing wheel 16 on a shaft 17 which in turn meshes with a pinion 18 mounted on shaft 50. Alongside of this pinion on said shaft 50 is secured a gear 51 which meshes with a pinion 19 on a shaft 20, which is journaled in bearings in the lower ends of arms $C^2$ which extend down from the ends of carriage C. Said pinion 19 meshes with a gear 21 on a shaft 22 mounted in a U-frame 23, which is mounted to pivot on shaft 20. Said shaft 22 carries a pulley 24 belted by a belt 25 to another pulley 26 on a shaft 27, mounted in suitable bearings on the side of the frame A. Said frame 23 is connected by an arm 52 to shaft 27 which arm serves as a distance piece to take the pull of belt 25. The distance piece or arm 52 attaching pivotally to frame 23, causes said frame to swing on shaft 20 as carriage C is moved toward or from the grinding wheel. Said shaft 27 is provided with a cone-pulley 28 on its other end which is geared by a belt 29 to a cone-pulley 30 upon said main driving shaft 1, thus completing the chain of gearing. A short shaft 54 is journaled alongside each end of screw $D^2$ and is provided with a gear 55 which meshes with the pinion 15 and a hand wheel 56 on each of said shafts 54 serves as a means for operating said screw by hand.

Lever $D^4$ may be operated by hand on the pivot $d^7$ to shift the locking bar $D^3$, and I have also provided an automatic arrangement as follows:—A rod $d^8$ is mounted upon the front side of the bowl B and has two adjustable stops $d^9$ mounted thereon with which a downwardly extending arm $d^{10}$ on said lever $D^4$ is adapted to engage as the carriage travels back and forth. When, in such travel, said arm $d^{10}$ strikes one of said stops said lever will be shifted and the locking bar $D^3$ shifted to engage and lock the opposite nut $d^4$. As one of said nuts is formed with a right-hand thread and the other with a left-hand thread, the freeing of one and locking of the other, by this motion of bar $D^3$ serves to shift the travel of the carriage in the opposite direction while the screw-rod is running in the same direction. A pin $d^{11}$ with a conical point is mounted to project somewhat from the face of slider D directly in line with the center of the pivot $d^7$. The outer end of lever $D^4$ is formed with a socket in which is mounted a sliding pin $d^{14}$ with a wedge-shaped outer end, which is normally held in a position to engage the point of said pin $d^{11}$ by a spring $d^{13}$. Thus as said arm $d^{10}$ strikes one or the other of the stops $d^9$ it will throw said lever around so that the tapered face of the sliding pin $d^{14}$ will pass over the conical point of the projecting pin $d^{11}$ and when the center point is passed said spring will operate to quickly shift the lever by forcing the tapered face of pin $d^{14}$ outwardly over the conical end of said pin $d^{11}$ and thus throw the locking bar $d^3$ and shift the travel of the carriage at the exact point desired.

The base E is swiveled upon the slider D by means of a pivot bolt $e$ and carries the head stock E′ and the foot-stock E² which are secured thereon in the usual or any desired manner and are of any approved construction for the purpose.

The pump is a rotary pump of the construction shown most clearly in Fig. 8, consisting of a frame F mounted upon a pivot $f$ on a bracket $f'$ projecting out from the side of the casting B⁴ and having a friction wheel F′ on a shaft $f^4$ adapted to engage with a friction wheel F² mounted on the grinding wheel spindle B³. The pump proper consists of a casing F³ attached to one side of said frame, having a section of hose $f^2$ leading down to near the bottom of the bowl B and a discharge hose $f^3$ leading into the grinding wheel casing in front of the grinding wheel, and having a rotary pump F⁴ mounted upon the shaft $f^4$ on which said friction wheel F′ is mounted. The operation will be readily understood.

The operation is as follows:—The work being secured in position in the head-stock and foot-stock and the grinding wheel being adjusted through the sleeve B′ and the supporting device to the desired relative position with said work, and the stops $d^9$ being fixed upon the rod $d^8$ to trip the lever D⁴ to reverse the travel of the work holding carriage so as to traverse across the grinding wheel just that portion of the work to be ground, the driving belt 2 is thrown on to the pulley on the main driving shaft (through an ordinary belt-shifter 60, 61, 62, or any suitable mechanism) which being geared to the grinding wheel spindle B³ and the work-holding carriage traversing screw D², as before described, operates to traverse the work back and forth to bring that portion of its surface desired to be ground across the face of the grinding wheel, the operator feeding the work to said grinding wheel through the screw-rods $c^2$ as before described. The rotation of the grinding wheel spindle B³ will, as will be readily understood, drive the pump F and operate to pump the water from the bowl B to the work, continuously.

Having thus fully described my said invention, what I claim as new and desire to secure by Letters Patent, is:—

1. In a grinding machine, the combination, of the base, a water-containing bowl on the top of said base, a central support within said bowl, the grinding-wheel mounted on said support, and the work-holding devices mounted upon the top of said bowl, substantially as set forth.

2. In a grinding machine, the combination, of the base having a bowl-shaped top, a central support within said bowl, the grinding-wheel mounted on said support, a pump within said bowl arranged to pump liquid from said bowl to the work, the work holding carriage mounted on the edges of said bowl, and the work-holding devices mounted upon said carriage, substantially as set forth.

3. In a grinding machine, the combination, of the hollow base, the bowl-shaped casting mounted on the top of said base and having a central perforation surrounded by an annular flange extending upwardly within said bowl, a support mounted within said central perforation, the grinding wheel mounted upon its top, a pump attached to said support and arranged to be operated from the grinding wheel spindle to conduct the water in the bowl to the work, the work-holding carriage mounted upon the top of said bowl and the work holding and feeding devices mounted upon said carriage, substantially as set forth.

4. In a grinding machine, the combination, of the hollow base, the bowl-shaped top formed with a central opening and having an annular flange around said opening extending up within said bowl and also downwardly through the top of said base, a hollow support mounted within said central opening and supported on adjustable parts carried by said base, the grinding wheel spindle journaled in the top of said hollow support, the main driving shaft journaled in said base and connected with the said grinding wheel spindle by a belt running through said hollow support, the work holding devices mounted upon the top of said bowl, and means for feeding and adjusting said work holding devices, substantially as set forth.

5. In a grinding machine, the combination, of the hollow base, the bowl-shaped top mounted thereon, a central support extending up from within said bowl, the grinding wheel spindle journaled in bearings thereon, the grinding wheel on said spindle, a driving shaft journaled in said base, gearing connecting said driving shaft and said grinding wheel spindle and the work holding devices mounted upon the top of said bowl adjacent to the grinding wheel, substantially as set forth.

6. In a grinding machine, the combination, of the hollow base, the bowl-shaped top mounted thereon formed with a central opening and having an annular flange surrounding said opening extending up within said bowl and also extending down through the top of said base, a hollow support mounted within said opening and extending to above the end of the sleeve in said bowl and to below the end of the sleeve within said base, said lower end being connected with adjustable supporting devices carried by said base, the grinding wheel mounted on said upper end and the work holding and feeding devices supported on said bowl, substantially as set forth.

7. In a grinding machine, the combination, of the hollow base, the bowl-shaped top secured thereon, the grinding wheel support mounted in a central perforation to extend within said bowl and also within said base, the lower end of said support being connected to a block mounted upon a screw-rod by which it may be adjusted, the grinding wheel spindle mounted in bearings on said support, a driving shaft in said base, gearing connecting said driving shaft with the grinding wheel spindle, and the work supporting devices on said bowl, substantially as set forth.

8. In a grinding machine, the combination, of the hollow base, the bowl-shaped top mounted thereon having a central opening surrounded by an upwardly extending annular flange, the hollow support mounted within said central opening and formed with bearings upon its upper end, the grinding wheel spindle mounted in said bearings, the lower end of said hollow support being formed with a circumferential groove, a yoke engaging with said groove mounted upon a screw journaled in suitable bearings on the base, means for operating said screw, and work holding devices mounted on the top of said bowl, substantially as set forth.

9. In a grinding machine, the combination, of the hollow base, the bowl-shaped top mounted thereon, having a central opening with an annular flange around said opening, the central sleeve or support mounted in said opening, the grinding wheel spindle journaled in bearings in its top, an adjustable block carrying a yoke engaging with the lower end of said support, a driving shaft journaled in bearings in said base and connected by a belt extending through said support with the grinding wheel spindle, said belt passing over a tightening device, mounted upon the adjustable block carrying said support, and the work holding device mounted on the top of said bowl, substantially as set forth.

10. In a grinding machine, the combination, of the frame, a bowl-shaped top mounted thereon formed on one side with parallel opposite edges, a work supporting carriage mounted to travel upon said parallel edges, means for adjusting it to and from the grinding wheel, a slider mounted on said carriage, work holding devices mounted upon said slider and a traversing mechanism for traversing said slider back and forth upon said carriage comprising a screw with a right and left hand thread journaled at its ends in bearings on said carriage and engaging with loosely mounted nuts one of which has a right hand and the other a left hand thread, said nuts being secured to travel with said slider and adapted to be locked alternately to said slider, and a sliding locking bar for holding either nut from rotating as desired, substantially as set forth.

11. In a grinding machine, the combination of the base, the bowl-shaped top mounted thereon provided with parallel tracks, a work holding carriage mounted on said tracks, means for adjusting it toward and from the grinding wheel, a slider mounted on the top of said carriage, a traversing screw journaled in bearings on the carriage and engaging with nuts secured to said slider and adapted to be locked or left free to rotate with said screw, a locking device for locking either one or the other of said nuts, gearing connecting said shaft with the main driving shaft, and the grinding wheel support with the grinding wheel thereon mounted within the bowl-shaped top, substantially as set forth.

12. In a grinding machine, the combination of the base, the bowl-shaped top mounted thereon, the work holding carriage mounted upon one side of said top, the slider mounted on the top of said carriage and having a right hand and a left hand nut mounted one at each end thereof, a traversing shaft having a right and left hand thread mounted within said nuts and journaled in suitable bearings on the carriage, a locking bar adapted to lock either one or the other of said nuts from rotation on said shaft, means for rotating said shaft connected with the main driving shaft and a lever connected with said locking bar and adapted to be operated by a contact with an adjustable stop on the side of the frame as said slider travels back and forth, substantially as set forth.

13. In a grinding machine, the combination, with the grinding mechanism and the work holding carriage, of a slider mounted on said carriage and adapted to support the work holding devices, and a traversing mechanism for said slider comprising a screw journaled in suitable bearings on the carriage and formed with a right and left-hand screw-thread upon its surface, a right-hand nut and a left-hand nut loosely mounted on said screw, means for locking one or the other of said nuts to said slider and means for rotating said screw, substantially as set forth.

14. In a grinding machine, the combination, of the grinding mechanism, the work carriage, the slider mounted on said carriage, the work holding devices mounted on said slider and a traversing mechanism for said slider comprising a screw journaled in bearings on the carriage and formed with a right and left hand screw-thread on its surface, said screw extending through fixed parts on said slider and engaging loosely with a right-hand nut and a left-hand nut each of which is secured to travel with said slider, and means for locking either of said nuts from rotation, as desired, and means for operating said screw, substantially as set forth.

15. In a grinding machine, the combination of the frame, the grinding mechanism, the work carriage, the slider on said work carriage, the work holding devices on said slider and traversing mechanism for said slider comprising a screw having a right and left hand thread upon its surface, mounted to extend through parts on said slider and journaled at its ends in bearings on the carriage, a right-hand nut and a left-hand nut on said screw secured to travel with said slider, means for locking one or the other of said nuts from rotation comprising a sliding bar adapted to engage with one or the other, shifting mechanism for said bar adapted to be operated by contact with adjustable stops, and means for operating said screw, substantially as set forth.

16. In a grinding machine, the combination, of the frame, the grinding mechanism, the work carriage, the slider on said work carriage, traversing mechanism for said slider comprising a screw with right and left hand threads upon its surface and a right-hand and a left-hand nut loosely mounted thereon, each of said nuts being secured to travel with the slider, mechanism for locking either one or the other of said nuts from rotation comprising a sliding locking-bar adapted to engage with either one or the other of said nuts, an operating lever for said locking-bar having a part adapted to contact with an adjustable stop on the frame, and means for operating said screw, substantially as set forth.

17. In a grinding machine, the combination, of the frame, the carriage mounted upon tracks, means for adjusting said carriage, a slider mounted on said carriage to slide transversely to the movement thereof, traversing mechanism for said slider comprising a screw with a right and left-hand thread upon its surface journaled in bearings on the carriage and engaging with a loosely mounted right-hand nut and a loosely mounted left-hand nut secured to travel with the slider, means for locking either one or the other of said nuts from rotation, a gear wheel on said screw, and a train of gearing running therefrom to the main driving shaft a portion of which is mounted in a swinging pivoted frame, whereby the adjustment of said carriage is permitted without disturbing the relation of the several gears, substantially as set forth.

18. In a grinding machine, the combination, of the frame, the grinding mechanism, a main driving shaft geared to said driving mechanism, a work carriage, means for adjusting said work carriage, a slider on said carriage, traversing mechanism for said slider, comprising a right and left-hand screw engaging with suitably arranged nuts in said slider, means for locking one or the other of said nuts, a gear on said screw and a train of gearing connecting said gear with said main driving shaft, all substantially as set forth.

19. In a grinding machine, the combination, of the grinding mechanism, the work carriage, the slider on said carriage, traversing mechanism for said slider comprising a screw with a double thread, suitably arranged nuts on said slider engaging said screw, means for securing said nuts from rotation one at a time, and means for operating said screw, substantially as set forth.

20. A grinding machine having a carriage, means for adjusting said carriage, a slider on said carriage, means for traversing said slider at right angles to the adjustment of said carriage, a main driving shaft, a train of gearing running from said main driving shaft to the slider traversing mechanism, a part of which gearing is mounted in a swinging frame, whereby the adjustment of said carriage is permitted without interfering with the relation of the several parts of said gearing, substantially as set forth.

21. The combination with the carriage of a grinding machine, of means for adjusting said carriage, a slider mounted on said carriage to slide transversely of its movement, traversing mechanism for said slider comprising a screw journaled in bearings on the carriage, a gear on said screw, a train of gearing running from said gear to the main driving shaft, a part of said train of gearing being mounted in a pivoted swinging frame, whereby said carriage may be adjusted in and out without interfering with the relation of the gears, substantially as set forth.

In witness whereof, I have hereunto set my hand and seal at Waynesboro, Pa., this 13th day of December, A. D. nineteen hundred and five.

ABRAHAM B. LANDIS. [L. S.]

Witnesses:
 MERTS RUSSELL,
 ALF. N. RUSSELL.